No. 739,214. PATENTED SEPT. 15, 1903.
H. H. PHILLIPS.
BROILER FOR GAS STOVES.
APPLICATION FILED MAR. 24, 1903.
NO MODEL.

Witnesses
Inventor
Henry H. Phillips
By
Attorneys

No. 739,214. Patented September 15, 1903.

UNITED STATES PATENT OFFICE.

HENRY H. PHILLIPS, OF PHILADELPHIA, PENNSYLVANIA.

BROILER FOR GAS-STOVES.

SPECIFICATION forming part of Letters Patent No. 739,214, dated September 15, 1903.

Application filed March 24, 1903. Serial No. 149,244. (No model.)

*To all whom it may concern:*

Be it known that I, HENRY H. PHILLIPS, a citizen of the United States, residing in the city and county of Philadelphia, State of Pennsylvania, have invented new and useful Improvements in Broilers for Gas-Stoves, of which the following is a specification.

My invention consists of a broiler, more particularly designed for a gas-stove, embodying a novel arrangement of a receiver for the drippings from an article while being broiled and means for preventing the overheating of said drippings and consequent smell thereof and preventing greasing or smearing of the stove.

It also consists of means for keeping said receiver in cool condition.

It further consists of details of construction, as will be hereinafter described.

Figure 1:
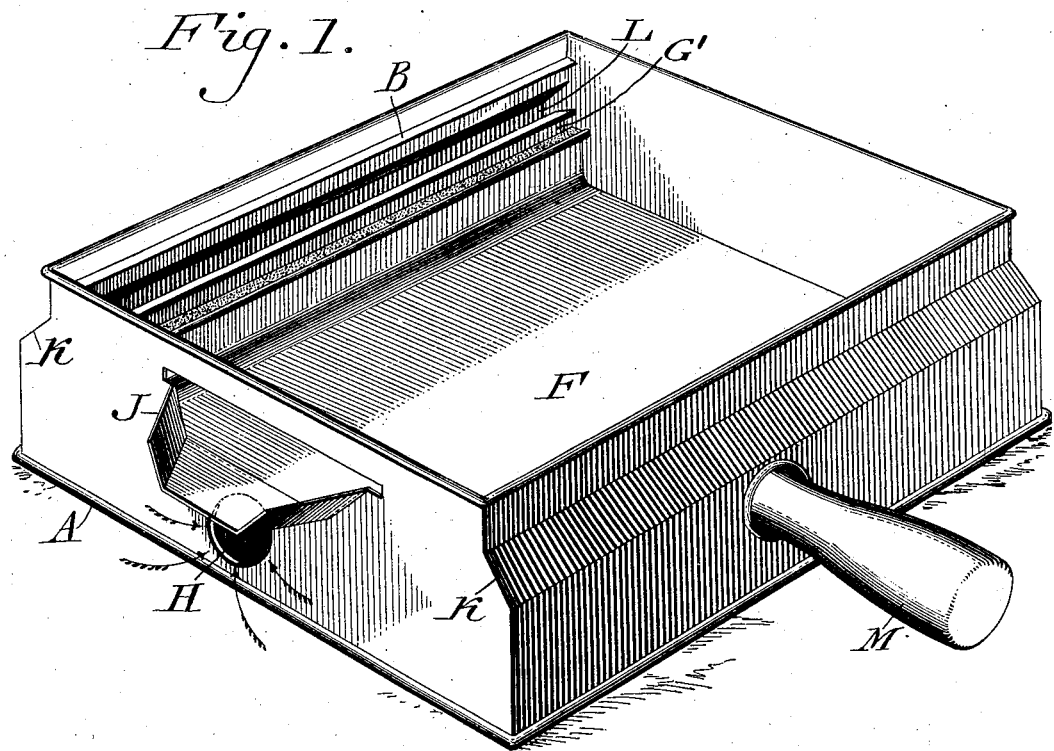
Figure 2:
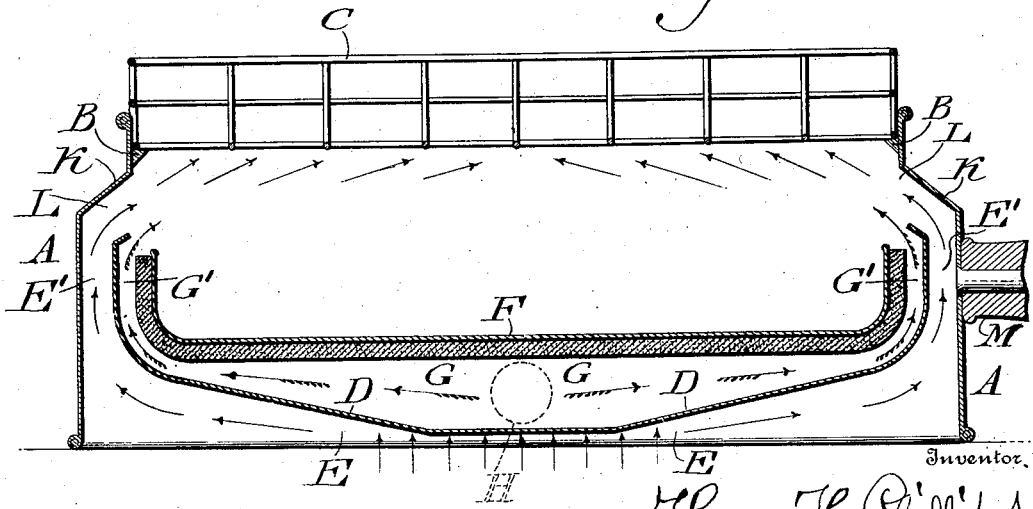

Figure 1 represents a perspective view of a broiler for a gas-stove embodying my invention. Fig. 2 represents a vertical section thereof.

Similar letters of reference indicate corresponding parts in both views.

Referring to the drawings, A designates the frame of the broiler, within the upper part of which are the shoulders B for supporting the gridiron C. (Shown in Fig. 2, but removed from Fig. 1 for the sake of clearness in the latter.)

D designates a plate or partition which is secured within the frame near the lower portion thereof and is located above the bottom of the frame and separated from the sides thereof, forming the flues E E' for the passage of the hot air or heat from the gas-jets of a gas-stove on which the broiler is placed. Above said partition is the pan or trough F, which is separated therefrom, forming the chamber G and flues G', constituting a passage for cold air, which is admitted thereto through an opening H in the end wall of the frame A, said pan being adapted to receive water, and is provided with a spout J for discharging the contents of said pan, it being noticed that the pan is located below the gridiron. Connected with the frame above the upper end of the partition D and pan F is the deflector K, which extends inwardly from said wall and forms the flues L, whereby hot air or heat is directed from the flues E' to the gridiron C. On the side of the frame is the handle M for evident purposes.

The operation is as follows: Water is placed in the pan F, the gas is ignited, the broiler located on the stove, and the gridiron supplied with the food or article to be broiled. The heat now passes through the flues E E' and is deflected through the flues L to the space below the gridiron, so as to effectively act on the food thereon. The fat or other drippings from the gridiron drop into the pan F, where they are collected and cooled and so prevented from emitting smell, while at the same time said pan acts as an interposed guard, preventing drippings from falling below the same and reaching the stove, whereby greasing and smearing of the latter and burning of the drippings on the same are prevented. As air is permitted to enter the chamber G and flues G' and circulate therethrough, the bottom and sides of the pan are kept cold or comparatively cold, and thus the heating of the contents of the pan is prevented. The pan is formed entirely of or lined with heat-non-conducting material, preferably asbestos, which is unaffected by heat and not liable to corrosion. When the gridiron is removed, the broiler may be turned sidewise, whereby the contents of the pan may be poured out by the spout J, and said pan may be cleansed and dried and so kept in sweet and serviceable condition, as may also be the remaining members of the device.

In the use of the term "gridiron" I include all forms, whether made of cast or sheet metal, wire, &c.

Various changes may be made in the details of construction without departing from the general spirit of my invention, and I do not, therefore, desire to be limited in each case to the same.

Having thus described my invention, what I claim as new, and desire to secure by Letters Patent, is—

1. A broiler comprising a casing, a partition within said casing and extending nearly to the sides thereof, a drip-pan in said casing above said partition and a gridiron-support above said pan, the wall of said casing being apertured to permit the entrance and circulation of air between said partition and said pan.

2. A broiler comprising a casing, a partition within said casing and extending nearly to the sides thereof, a drip-pan in said casing above said partition and leaving a space between its wall and that of said partition and a gridiron-support above said pan, the wall of said casing being apertured to permit the entrance of air between said partition and said pan.

3. A broiler having a casing, a drip-receiver therein, below the gridiron thereof, and a cold-air passage below said drip-receiver, said passage being in communication with the atmosphere.

4. In a broiler, a casing, a gridiron-support thereon, a partition within said casing and extending nearly to the sides thereof, a drip-pan in said casing above said partition, the wall of said casing being apertured to permit the entrance and circulation of air between said partition and said pan.

5. A broiler comprising a casing, a partition within said casing and extending nearly to the sides thereof, a drip-pan in said casing above said partition and a gridiron, the upper portion of the wall of said casing being deflected inwardly toward and beneath said gridiron.

6. In a broiler, a casing provided adjacent its upper edge with an inwardly-extending deflector and a gridiron-support above said deflector, a flue for hot air in said casing and a drip-receiver above said flue.

7. A broiler consisting of a casing provided with means for supporting a gridiron at the top thereof, a flue for hot air at the bottom, a drip-receiver below the gridiron, and a cold-air passage below said receiver.

HENRY H. PHILLIPS.

Witnesses:
JOHN A. WIEDERSHEIM,
S. R. CARR.